(12) United States Patent
Kawai

(10) Patent No.: US 11,568,190 B2
(45) Date of Patent: Jan. 31, 2023

(54) LIQUID SURFACE DETECTOR, IMAGE FORMING APPARATUS, AND METHOD FOR CONTROLLING LIQUID SURFACE DETECTOR

(71) Applicant: KYOCERA Document Solutions Inc., Osaka (JP)

(72) Inventor: Hisaji Kawai, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 39 days.

(21) Appl. No.: 17/207,064

(22) Filed: Mar. 19, 2021

(65) Prior Publication Data
US 2021/0303955 A1   Sep. 30, 2021

(30) Foreign Application Priority Data
Mar. 25, 2020  (JP) .............................. JP2020-054940

(51) Int. Cl.
G06K 15/00 (2006.01)
B41J 2/175 (2006.01)
B41J 29/393 (2006.01)
G01F 23/263 (2022.01)
B41J 2/17 (2006.01)

(52) U.S. Cl.
CPC ........ G06K 15/4075 (2013.01); B41J 2/1721 (2013.01); B41J 2/17566 (2013.01); B41J 29/393 (2013.01); G01F 23/266 (2013.01); G06K 15/002 (2013.01); G06K 15/408 (2013.01); B41J 2002/1728 (2013.01)

(58) Field of Classification Search
None
See application file for complete search history.

(56) References Cited

U.S. PATENT DOCUMENTS

| | | | | |
|---|---|---|---|---|
| 4,506,709 A * | 3/1985 | Dennhardt | .............. | B67C 3/285 73/304 C |
| 6,014,029 A * | 1/2000 | Soto | ..................... | G01N 27/221 137/78.3 |
| 7,509,856 B1* | 3/2009 | Winkens | ............... | G01F 23/266 73/304 C |
| 2012/0306974 A1* | 12/2012 | Nicholson, III | ..... | B41J 2/17566 347/86 |

FOREIGN PATENT DOCUMENTS

JP    H 07-260549 A    10/1995

* cited by examiner

*Primary Examiner* — Alejandro Valencia
(74) *Attorney, Agent, or Firm* — Stein IP, LLC

(57) ABSTRACT

A liquid surface detector includes an electrode pad, a coil, a memory, and a detection control circuit. The electrode pad is attached to an outer side surface of a tank of the image forming apparatus. The coil is connected to the electrode pad. The memory stores initial values. The detection control circuit determines a capacitance (first capacitance) of a first resonance circuit including the coil and the tank with the electrode pad. When determining a liquid surface level value, the detection control circuit subtracts an error value from the first capacitance so as to determine a first corrected capacitance, and determines the liquid surface level value based on the first corrected capacitance and the initial value.

10 Claims, 7 Drawing Sheets

LIQUID SURFACE DETECTOR, IMAGE FORMING APPARATUS, AND METHOD FOR CONTROLLING LIQUID SURFACE DETECTOR

INCORPORATION BY REFERENCE

This application is based upon and claims the benefit of priority from the corresponding Japanese Patent Application No. 2020-054940 filed Mar. 25, 2020, the entire contents of which are hereby incorporated by reference.

BACKGROUND

The present disclosure relates to a liquid surface detector for determining a value indicating a liquid surface height by sensing a current capacitance based on a resonance frequency. In addition, the present disclosure relates to an image forming apparatus including the liquid surface detector. Further, the present disclosure relates to a method for controlling the liquid surface detector.

When detecting a liquid surface height (level of liquid) in a container or tank, a capacitive sensor may be used. In general, the capacitive sensor includes a pair of electrodes. The pair of electrodes acts as a capacitor. For instance, the pair of electrodes is arranged in the container so that the long sides thereof extend in the up and down direction. As the amount of liquid in the container is more, the amount of liquid between the electrodes is more. Dielectric constant between the electrodes changes along with the height of liquid in the container. Capacitance changes in accordance with the degree that the electrode is soaked in the liquid.

There is known a device that detects a liquid surface height on the basis of a capacitance change as follows. Specifically, there is known a liquid surface detecting device including a liquid surface sensor that is inserted in liquid and has a cylindrical external electrode and an internal electrode between which an insulation gap is formed. An AC voltage is applied between the external electrode and the internal electrode of the liquid surface sensor, capacitance between the external electrode and the internal electrode is detected on the basis of the applied voltage, and liquid surface is detected on the basis of the detected capacitance.

There is an image forming apparatus that deals with liquid. For instance, there is an image forming apparatus that performs printing by using ink. It is considered that such an image forming apparatus is equipped with a liquid surface detector. In order to accurately detect a liquid surface height, the liquid surface detector may include a sensor for detecting that the liquid surface reaches an upper limit (upper end), a sensor for measuring current capacitance between electrodes, and a sensor for detecting that the liquid surface is at a lower limit (no liquid). Using these three sensors, capacitance at the lower limit, capacitance at the upper limit, and current capacitance between the electrodes can be sensed. In this way, it is possible to determine at which level (height) the current liquid surface is between the lower limit and the upper limit, i.e. between a minimum level and a maximum level.

However, providing at least three sensors, the cost for manufacturing the liquid surface detector is increased. In order to lower the cost, it is considered to use only the sensor (electrodes) for measuring current capacitance between the electrodes. For instance, the capacitance when the liquid surface is at the lower limit and the capacitance when the liquid surface is at the upper limit are written to a memory. When measuring a liquid surface level, data in the memory are used. However, detection environment (measuring condition) of the liquid surface detector differs between when the capacitance values are written to the memory and when the liquid surface detector is actually attached to the image forming apparatus. For instance, a stray capacitance between a circuit for calculating the capacitance and the electrodes (capacitor) changes.

Therefore, the capacitance values written to the memory may not be appropriate. As a result, the liquid surface height may not be detected accurately. Note that the document describing the above-mentioned known liquid surface detector does not describe about writing data to the memory.

SUMMARY

A liquid surface detector according to the present disclosure is attached to the image forming apparatus. The liquid surface detector includes an electrode pad, a coil, a memory, and a detection control circuit. The electrode pad is attached to an outer side surface of a tank for containing liquid disposed in the image forming apparatus. The coil is connected to the electrode pad and is a part of a first resonance circuit. The memory stores an initial value in a nonvolatile manner. The detection control circuit senses a resonance frequency of the first resonance circuit in which the tank with the attached electrode pad is used as a capacitor. On the basis of the sensed resonance frequency, the detection control circuit determines a first capacitance as a capacitance of the first resonance circuit. When storing the initial value in the memory, the detection control circuit determines the first capacitance before attachment to the image forming apparatus. The memory stores the determined first capacitance as the initial value. When storing an error value in the memory, the detection control circuit determines the first capacitance after attachment to the image forming apparatus. The memory stores the error value based on a difference between the initial value and the first capacitance determined after attachment to the image forming apparatus. When determining a liquid surface level value as a value indicating a liquid surface height of the liquid in a height direction of the electrode pad, the detection control circuit determines the first capacitance, determines a first corrected capacitance by subtracting the error value from the determined first capacitance, and determines the liquid surface level value on the basis of the first corrected capacitance and the initial value.

A method for controlling a liquid surface detector according to the present disclosure includes: attaching an electrode pad of a liquid surface detector to an outer side surface of a tank for containing liquid disposed in an image forming apparatus; connecting a coil as a part of a first resonance circuit to the electrode pad; storing an initial value; sensing a resonance frequency of the first resonance circuit in which the tank with the attached electrode pad is used as a capacitor; determining a first capacitance as a capacitance of the first resonance circuit on the basis of the sensed resonance frequency; when storing the initial value, determining the first capacitance before attachment of the liquid surface detector to the image forming apparatus, so as to store the determined first capacitance as the initial value; when storing an error value in the memory, determining the first capacitance after attachment of the liquid surface detector to the image forming apparatus, so as to store the error value based on a difference between the first capacitance determined after attachment to the image forming apparatus and the initial value; and when determining a liquid surface level value as a value indicating a liquid surface height of the liquid in a height direction of the electrode pad, determining the first capacitance, determining a first corrected capacitance by subtracting the error value from the determined first capacitance, and determining the liquid surface level value on the basis of the first corrected capacitance and the initial value.

Other objects of the present disclosure and specific advantages obtained by the present disclosure will become more apparent from the description of the embodiment given below.

DETAILED DESCRIPTION

The present disclosure is aimed at decreasing an error caused by a change in detection environment, when a liquid surface detector including a memory for storing data for detecting a liquid surface height is attached to an image forming apparatus. The liquid surface height can be accurately detected. Hereinafter, with reference to FIGS. 1 to 9, there are described a liquid surface detector 9 and an image forming apparatus 100 including the liquid surface detector 9 according to an embodiment of the present disclosure. The image forming apparatus 100 performs printing by using ink. The image forming apparatus 100 described below is a printer. Note that the image forming apparatus 100 may be a multifunction peripheral.

(Outline of Image Forming Apparatus 100)

Figure 1:
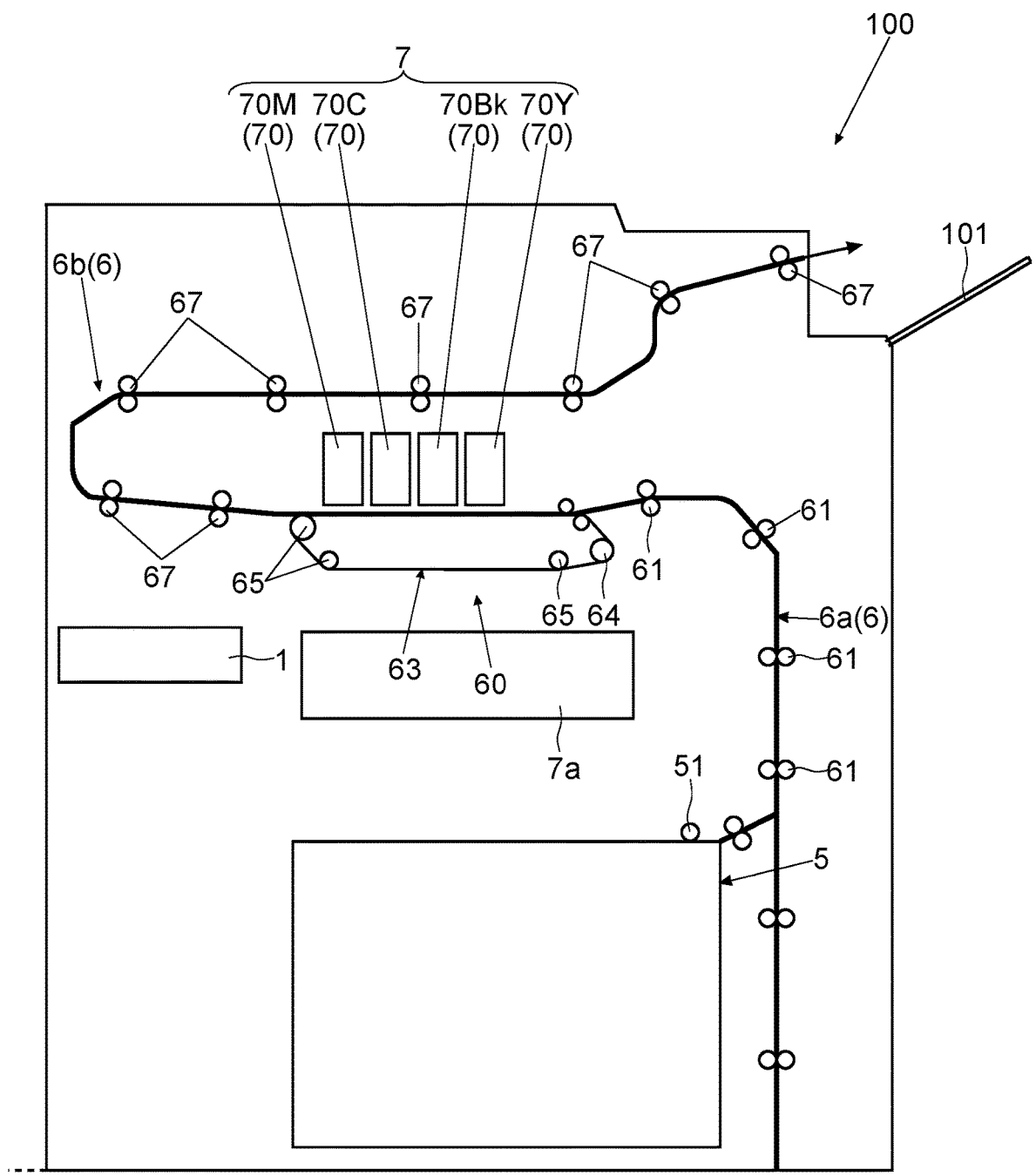
FIG. 1 is a diagram illustrating an example of an image forming apparatus according to an embodiment.
Figure 2:
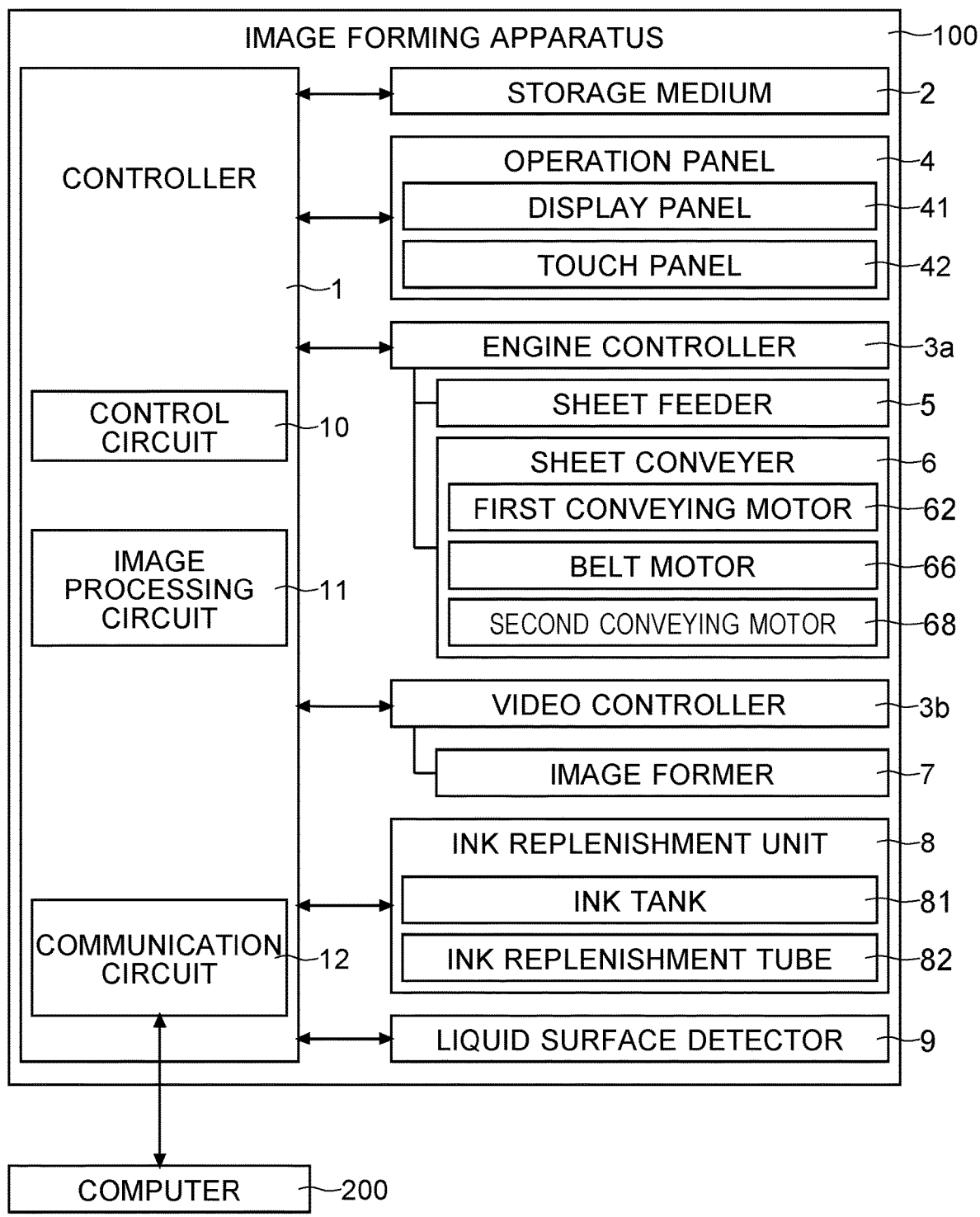
FIG. 2 is a diagram illustrating an example of the image forming apparatus according to the embodiment.

First, with reference to FIGS. 1 and 2, an outline of the image forming apparatus 100 according to the embodiment is described. The image forming apparatus 100 performs printing on a paper sheet. The image forming apparatus 100 includes a controller 1, a storage medium 2, an engine controller 3a, a video controller 3b, an operation panel 4, a sheet feeder 5, a sheet conveyer 6, an image former 7, an ink replenishment unit 8, and the liquid surface detector 9. The controller 1, the engine controller 3a, and the video controller 3b constitute a circuit board including a control circuit and an arithmetic circuit, for example.

The controller 1 issues operation commands to individual portions of the image forming apparatus 100. The controller 1 controls a print job. In the print job, the controller 1 issues to the engine controller 3a a command for feeding and conveying a paper sheet. In accordance with this command as a trigger, the engine controller 3a controls operations of the sheet feeder 5 and the sheet conveyer 6. In addition, in the print job, the controller 1 generates image data for ink ejection. The controller 1 sends to the video controller 3b a print command and the image data for ink ejection. On the basis of the image data for ink ejection, the video controller 3b controls a line head 70 to eject ink.

The controller 1 is a circuit board including a control circuit 10, an image processing circuit 11, and a communication circuit 12. For instance, the control circuit 10 is a CPU. The control circuit 10 performs calculation and processing on the basis of a control program and control data stored in the storage medium 2. The storage medium 2 includes a nonvolatile storage device such as a ROM or a storage (an HDD or a flash ROM), and a RAM. The image processing circuit 11 performs image processing of image data to be used for printing (image data for printing) and generates the image data for ink ejection.

The communication circuit 12 includes a communication connector, a communication control circuit, and a communication memory. The communication memory stores communication software. The communication circuit 12 communicates with a computer 200. For instance, the computer 200 is a PC or a server. The controller 1 receives print job data from the computer 200. The print job data includes print setting and print contents. For instance, the print job data includes data described in a page description language. The controller 1 (image processing circuit 11) analyzes the received (input) print job data. On the basis of the analysis result of the print job data, the controller 1 generates raster data (image data for printing).

The engine controller 3a includes an engine control circuit and an engine memory, for example. The engine control circuit is a CPU, for example. The engine memory stores programs and data concerning sheet feeding control and sheet conveying control.

The video controller 3b is a circuit board or a chip. The video controller 3b includes a video control circuit and an image memory. The video control circuit performs image processing so as to control ink ejection of the line head 70. The image memory is a memory for storing the image data for ink ejection and data necessary for the image processing and the ink ejection. The image memory is a DRAM, for example.

The operation panel 4 includes a display panel 41 and a touch panel 42. The controller 1 controls the display panel 41 to display a setting screen and information. The display panel 41 displays images for operation, such as keys, buttons, and tabs. The touch panel 42 detects a touch operation to the display panel 41. On the basis of an output from the touch panel 42, the controller 1 senses the operated image for operation. The controller 1 senses a setting operation performed by a user.

The sheet feeder 5 stores paper sheets. The sheet feeder 5 includes a sheet feed roller 51. The sheet feed roller 51 contacts with the paper sheet set in the sheet feeder 5. A sheet feeding motor (not shown) is disposed for rotating the sheet feed roller 51. In the print job, the engine controller 3a rotates the sheet feeding motor, and thereby rotates the sheet feed roller 51. In this way, the paper sheet is sent out from the sheet feeder 5 to the sheet conveyer 6 (a first conveying unit 6a).

The sheet conveyer 6 conveys the paper sheet. The sheet conveyer 6 includes the first conveying unit 6a and a second conveying unit 6b. The first conveying unit 6a conveys the paper sheet fed from the sheet feeder 5 to the image former 7. The second conveying unit 6b conveys the paper sheet after passing through the image former 7 (line head 70) to a discharge tray 101. Note that a post processing device (option device, not shown) can be attached to a side surface (on the left side in FIG. 1) of the image forming apparatus 100.

As illustrated in FIG. 1, the first conveying unit 6a includes a conveying unit 60 and a first conveying roller pairs 61. A plurality of the first conveying roller pairs 61 are disposed. A first conveying motor 62 is disposed for rotating the first conveying roller pairs 61. In the print job, the engine controller 3a controls the first conveying motor 62 to rotate. The conveying unit 60 includes a conveyor belt 63, a drive roller 64, and a plurality of driven rollers 65. The conveyor belt 63 is stretched around the drive roller 64 and the driven rollers 65. A belt motor 66 is disposed for rotating the drive roller 64. In the print job, the engine controller 3a controls the belt motor 66 to rotate, and thereby turns the conveyor belt 63. Note that a plurality of holes are formed in the conveyor belt 63, for example. Further, a suction device (not shown) is disposed for sucking air through the holes. By this sucking action, a paper sheet position on the belt can be fixed.

The second conveying unit 6b includes a plurality of second conveying roller pairs 67. A second conveying motor 68 is disposed for rotating the second conveying roller pairs 67. In the print job, the engine controller 3a controls the second conveying motor 68 to rotate.

The image former 7 performs printing on the conveyed paper sheet. The image former 7 ejects ink onto the conveyed paper sheet. As illustrated in FIG. 1, the image former 7 includes four line heads 70. A line head 70Bk ejects black ink. A line head 70Y ejects yellow ink. A line head 70C ejects cyan ink. A line head 70M ejects magenta ink. Each of the line heads 70 is fixed. The line heads 70 are disposed above the conveying unit 60 (conveyor belt 63). A certain gap is formed between each line head 70 (nozzles in a bottom surface) and the conveyor belt 63. The paper sheet passes through this gap.

The line head 70 includes a plurality of nozzles. The nozzles are arranged in a direction (main scanning direction) perpendicular to a sheet conveying direction (in a direction perpendicular to the paper of FIG. 1). The nozzle is directed downward. An opening of each nozzle faces the conveyor belt 63. The controller 1 supplies the image data for ink ejection for printing to the video controller 3b. On the basis of this image data for ink ejection, the video controller 3b controls the line head 70 to eject ink from the nozzles to the conveyed paper sheet. The ink lands on the conveyed paper sheet, and an image is recorded (formed).

The ink replenishment unit 8 includes an ink tank 81 and an ink replenishment tube 82. The ink tank 81 contains ink to be replenished to the line head 70. The ink tank 81 is disposed for each of four colors. The ink replenishment tube 82 connects the ink tank 81 to the line head 70 of corresponding color. The ink is supplied to the line head 70 through the ink replenishment tube 82.

(Maintenance Unit 7a)

Figure 3:
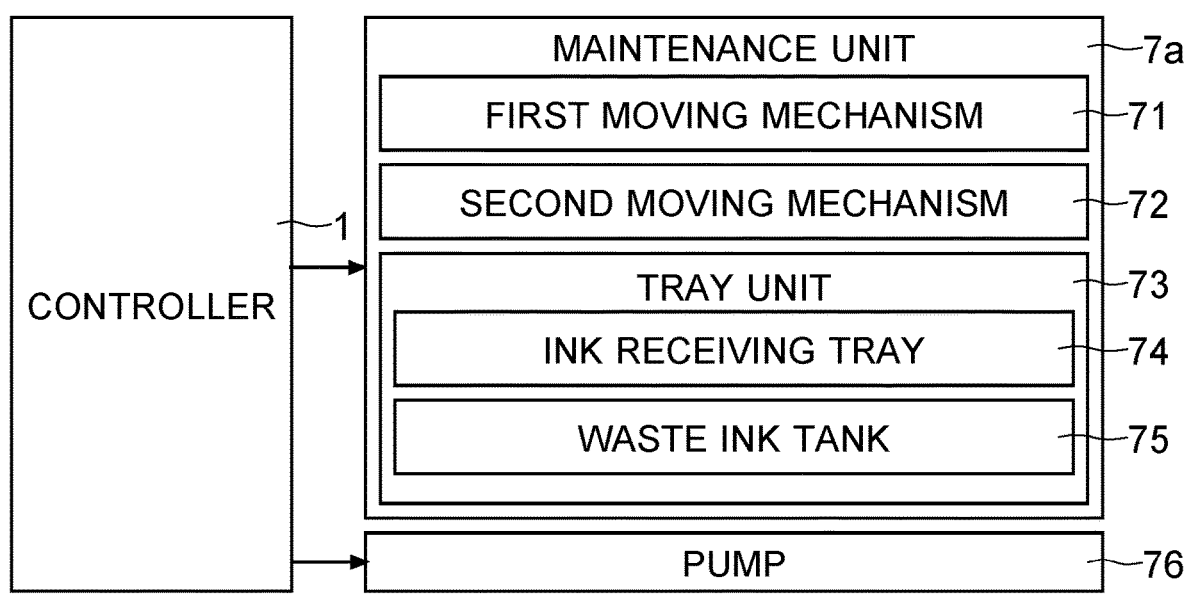
FIG. 3 is a diagram illustrating an example of a maintenance unit according to the embodiment.

Next, with reference to FIGS. 1 and 3, an example of a maintenance unit 7a according to the embodiment is described. The image forming apparatus 100 does not always print a solid image. During printing, some of the nozzles of the fixed line heads 70 may not eject ink. At the nozzles, an ink component (solvent) is volatilizing (evaporating). In the nozzle without ink ejection for a long period, viscosity of ink increases due to volatilization of the component. The ink with high viscosity is hardly ejected. If the increase in viscosity continues, the nozzle may be clogged at the end.

Therefore, the controller 1 controls the image former 7 (line head 70) to perform a purge process every predetermined time after starting printing. The purge process is a process of discharging ink from the line head 70 in order to prevent clogging. The purge process is one of maintenance processes. In the purge process, printing is stopped. During the purge process, the engine controller 3a inhibits feeding and conveying of the paper sheet.

The image forming apparatus 100 includes the maintenance unit 7a for maintenance of the line head 70. As illustrated in FIG. 1, the maintenance unit 7a is disposed below the line head 70. As illustrated in FIG. 3, the maintenance unit 7a includes a first moving mechanism 71, a second moving mechanism 72, and a tray unit 73.

The tray unit 73 includes an ink receiving tray 74. The ink receiving tray 74 is a tray for receiving and collecting ink discharged from the line head 70 (nozzles). For instance, the ink receiving tray 74 has an ink discharge hole formed in the middle thereof. The surface of the ink receiving tray 74 on which the ink falls is inclined so that the ink can flow to the ink discharge hole. Below the ink discharge hole, a waste ink tank 75 (corresponding to a tank) is disposed. The waste ink tank 75 receives the ink discharged and dropped from the ink discharge hole. In other words, the waste ink tank 75 collects the discharged ink as waste ink.

The first moving mechanism 71 moves the conveying unit 60 in a horizontal direction (a direction perpendicular to the paper of FIG. 1). In printing, the first moving mechanism 71 sets the conveying unit 60 below the line head 70. In the purge process, the controller 1 controls the first moving mechanism 71 to move the conveying unit 60 to a retracted position. The retracted position of the conveying unit 60 is a position away from below the line head 70.

The second moving mechanism 72 moves the tray unit 73 in an up and down direction (vertical direction). In the purge process, after moving the conveying unit 60 to the retracted position, the controller 1 controls the second moving mechanism 72 to move the tray unit 73 upward. In this way, the tray unit 73 moves toward the bottom surface of the line head 70. The second moving mechanism 72 moves the tray unit 73 up to a position below the line head 70. When the purge process is finished, the controller 1 controls the second moving mechanism 72 to move the tray unit 73 down to a lower limit position. After moving down, the controller 1 controls the first moving mechanism 71 to move the conveying unit 60 to the position below the line head 70.

In order to move the unit and the tray, each of the first moving mechanism 71 and the second moving mechanism 72 includes mechanical elements such as a motor, a gear, a belt, a pulley, and a wire. The controller 1 controls rotation of the motor and controls movement of the maintenance unit 7a. For the purge process, the image forming apparatus 100 includes a pump 76, too. The pump 76 is a device for applying a pressure to the ink in the direction of supplying the ink to each line head 70. As a result, the ink exudes from every nozzle. The ink is pressed out from each nozzle. This application of pressure enables to press the ink with increased viscosity out of the nozzle.

The controller 1 performs the purge process at a predetermined execution interval. The execution interval is a time period of a few minutes to 60 minutes, for example. The operation panel 4 may receive setting of the execution interval. In this case, the controller 1 performs the purge process for all the line heads 70 of four colors at the set execution interval. When the execution interval elapses from start of the print job or from the previous purge process, the controller 1 temporarily stops printing, performs the purge process, and restarts printing after the purge process.

(Liquid Surface Detector 9)

Figure 4:
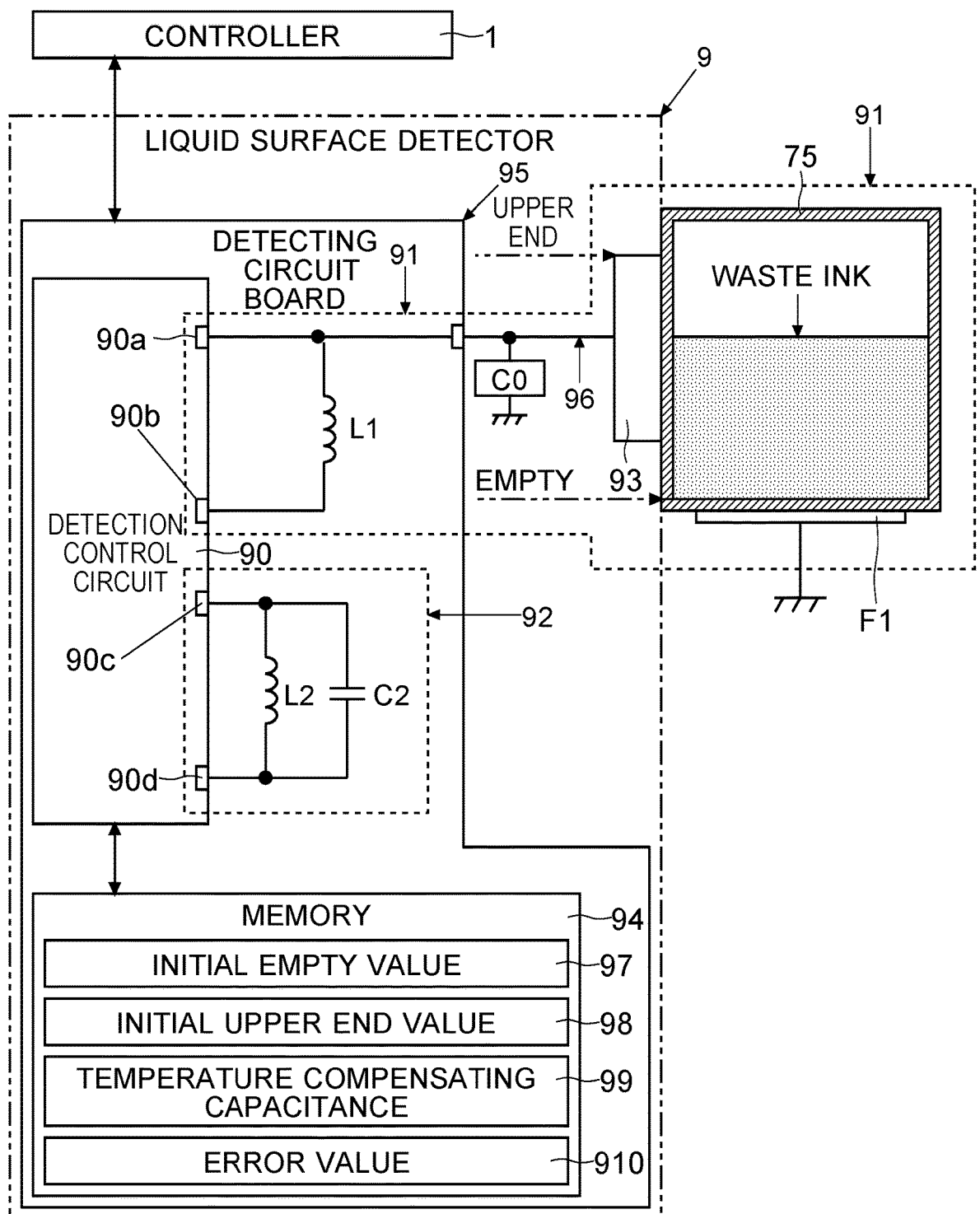
FIG. 4 is a diagram illustrating an example of a liquid surface detector according to the embodiment.

Next, with reference to FIG. 4, an example of the liquid surface detector 9 according to the embodiment is described. The liquid surface detector 9 includes a detection control circuit 90, a coil L1 (a part of a first resonance circuit 91), a second resonance circuit 92, an electrode pad 93 (a part of the first resonance circuit 91), and a memory 94. For instance, the detection control circuit 90 is an IC designed to be capable of detecting a resonance frequency and a capacitance. The memory 94 is a nonvolatile storage device. For instance, the memory 94 is an EEPROM. The memory 94 stores a plurality of initial values in a nonvolatile manner. The initial values include data for sensing resonance frequencies of the first resonance circuit 91 and the second resonance circuit 92, for determining capacitance of the waste ink tank 75, and for determining a liquid surface level value as a value indicating a liquid surface height in the waste ink tank 75 (detail will be described later).

The liquid surface detector 9 includes a detecting circuit board 95. The detection control circuit 90, the coil L1, the second resonance circuit 92, and the memory 94 are mounted on the detecting circuit board 95.

The waste ink tank 75 is disposed in the image forming apparatus 100. FIG. 4 shows an example in which the waste ink tank 75 is disposed on a frame F1 in the image forming apparatus 100. For instance, the frame F1 is made of metal and has conductivity. For instance, the frame F1 is made of iron. In order to use the waste ink tank 75 as a capacitor of the first resonance circuit 91, the electrode pad 93 is attached (glued) to the waste ink tank 75. The waste ink tank 75 can be replaced (removed). When the waste ink tank 75 is replaced, the electrode pad 93 is detached from the old waste ink tank 75. When the new waste ink tank 75 is disposed, the electrode pad 93 is attached to the new waste ink tank 75.

The electrode pad 93 is attached to one of the surfaces of the waste ink tank 75 except for the bottom surface (the surface contacting with the frame F1). A flat surface of the electrode pad 93 contacts and sticks to the side surface of the waste ink tank 75. The electrode pad 93 is attached to the outside (outer surface) of the waste ink tank 75. Therefore, the electrode pad 93 does not contact with the ink. FIG. 4 shows an example of attaching the electrode pad 93 to the side surface of the waste ink tank 75. In the example of FIG. 4, the longitudinal direction of the electrode pad 93 is parallel to the height direction of the waste ink tank 75 disposed in the image forming apparatus 100.

The waste ink tank 75 in itself is made of resin. The material of the waste ink tank 75 has insulating properties so that it can function as a capacitor. The long side length of the electrode pad 93 is equal to or less than the height (length in the up and down direction) of the waste ink tank 75. It may be possible that the position of the electrode pad 93 is fixed so that the electrode pad 93 contacts with the waste ink tank 75 in a fixed position when the waste ink tank 75 is attached.

The electrode pad 93 may have adhesiveness. The waste ink tank 75 may be provided with a mark so that the electrode pad 93 can be attached at a fixed position. The mark may be formed by any one of a sticker, an inscription, and painting. The mark may have the same size and shape as the attaching area of the electrode pad 93, or may be a line indicating the upper end position of the electrode pad 93.

The electrode pad 93 is connected to one end of the coil L1 via a signal line 96. The one end of the coil L1 is also connected to a first terminal 90a of the detection control circuit 90. The other end of the coil L1 is connected to a second terminal 90b of the detection control circuit 90. The first resonance circuit 91 includes the coil L1, the electrode pad 93, and the waste ink tank 75 as a capacitor. The first resonance circuit 91 is an LC resonance circuit. In order to determine a capacitance of the first resonance circuit 91 (the waste ink tank 75), the liquid surface detector 9 senses a resonance frequency of the first resonance circuit 91 that uses the waste ink tank 75 as a capacitor.

The detection control circuit 90 applies a signal to the first resonance circuit 91 (coil L1) using the first terminal 90a and the second terminal 90b. For instance, the detection control circuit 90 applies an AC voltage. The detection control circuit 90 monitors current flowing in the first resonance circuit 91 while changing the frequency. The detection control circuit 90 senses the frequency at which the current becomes maximum, as the resonance frequency of the first resonance circuit 91.

The second resonance circuit 92 includes a coil L2 and a capacitor C2. The second resonance circuit 92 is connected to the detection control circuit 90. One end of the coil L2 and one end of the capacitor C2 are both connected to a third terminal 90c of the detection control circuit 90. The other end of the coil L2 and the other end of the capacitor C2 are both connected to a fourth terminal 90d of the detection control circuit 90. The second resonance circuit 92 is not connected to the electrode pad 93.

The detection control circuit 90 applies a signal to the second resonance circuit 92 (coil L2) using the third terminal 90c and the fourth terminal 90d. For instance, the detection control circuit 90 applies an AC voltage. The detection control circuit 90 monitors current flowing in the second resonance circuit 92 while changing the frequency. The detection control circuit 90 senses the frequency at which the current becomes maximum, as the resonance frequency of the second resonance circuit 92.

(Detection of Value Indicating Liquid Surface Height of Liquid)

With reference to FIG. 4, detection of a value indicating a liquid surface height of a liquid by the liquid surface detector 9 according to the embodiment is described. The liquid surface detector 9 is attached to the image forming apparatus 100. Further, the electrode pad 93 is attached to the waste ink tank 75. The flat surface of the electrode pad 93 contacts with the waste ink tank 75. The liquid surface detector 9 determines the liquid surface level value. The liquid surface level value is a value indicating a liquid surface height of liquid (waste ink) in the waste ink tank 75.

Specifically, the detection control circuit 90 determines the liquid surface level value by calculation using the following expression (1):

liquid surface level value=(current capacitance−initial empty value 97)/(initial upper end value 98−initial empty value 97).  (1)

As understood from the expression (1), the liquid surface level value is a value indicating a percentage of the position (height) of the liquid surface in a range from 0% indicating no liquid to 100% indicating the upper end of the attached electrode pad 93. The detection control circuit 90 determines the ratio as the liquid surface level value. Note that when a negative value is obtained by the calculation, the detection control circuit 90 regards it as 0%.

The initial empty value 97 is a capacitance of the waste ink tank 75 with no liquid (when empty), which is obtained by measurement before attachment to the image forming apparatus 100. The initial upper end value 98 is a capacitance of the waste ink tank 75 when the liquid surface is at the upper end (when determining to be the upper end), which is obtained by measurement before attachment to the image forming apparatus 100. These initial values (the initial empty value 97 and the initial upper end value 98) are written to the memory 94 in a nonvolatile manner.

The material of the waste ink tank 75 is an insulating resin (plastic). Further, the waste ink tank 75 contacts with the frame F1 (on the bottom side in the example of FIG. 4). Therefore, the waste ink tank 75 is connected to the ground. Then, the electrode pad 93 and the frame F1 contacting with the waste ink tank 75 function as electrodes. The waste ink tank 75 stores charge in the space between the electrode pad 93 and the frame F1. In other words, using the electrode pad 93 and the grounded waste ink tank 75, the waste ink tank 75 can be regarded as a capacitor.

When the waste ink tank 75 is empty, the waste ink tank 75 is a capacitor having dielectric that is the insulating resin and air. When the waste ink tank 75 contains the waste ink, the waste ink tank 75 is a capacitor having dielectric that is the insulating resin, the liquid (waste ink), and air. In accordance with the liquid surface height of the waste ink, the dielectric constant of the waste ink tank 75 changes. The waste ink of this embodiment has a dielectric constant higher than that of air. Therefore, the capacitance of the waste ink tank 75 is larger as the liquid surface is higher.

The detection control circuit 90 senses the resonance frequency of the first resonance circuit 91. On the basis of the sensed resonance frequency, the detection control circuit 90 determines a capacitance (first capacitance) of the first resonance circuit 91 (current waste ink tank 75). By organizing the expression of the resonance frequency ($f=1/2\pi\sqrt{LC}$) or the resonance condition $XL=XC$ ($2\pi fL=1/2\pi fC$), the expression $C=1/(4\pi^2 f^2 L)$ is obtained. The detection control circuit 90 determines the capacitance of the first resonance circuit 91 by substituting the resonance frequency into f, and substituting the inductance value of the coil L1 of the first resonance circuit 91 into L. The memory 94 stores the inductance value of the coil L1 in a nonvolatile manner.

(Writing of Initial Values)

Figure 5:
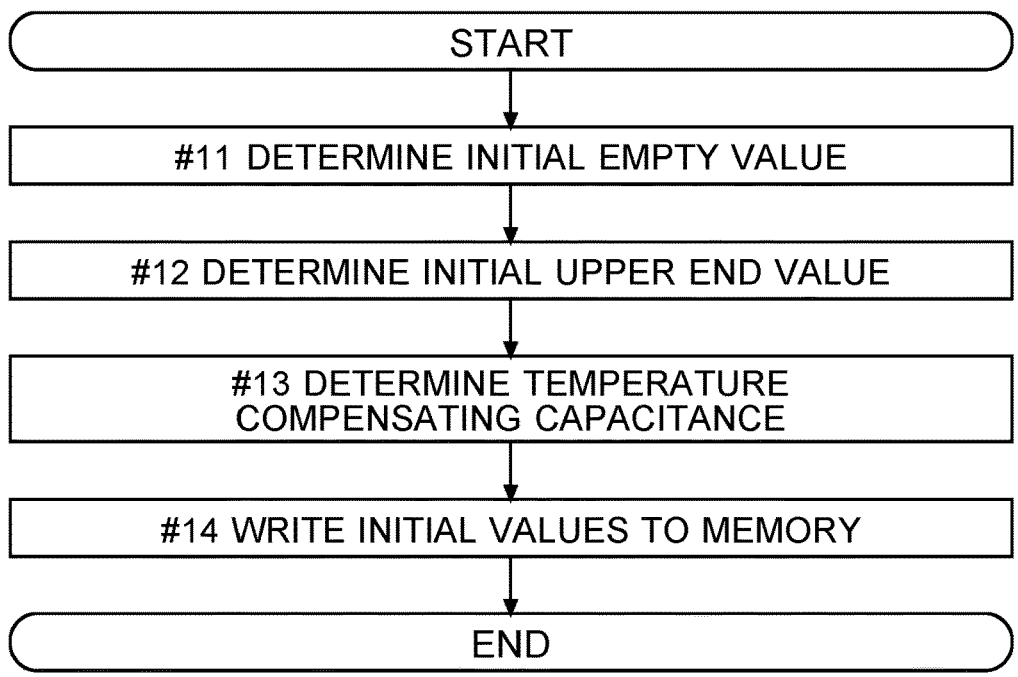
FIG. 5 is a diagram illustrating an example of a flow of writing initial values to a memory in the liquid surface detector according to the embodiment.

Next, with reference to FIG. 5, there is described an example of a flow of writing initial values to the memory 94 in the liquid surface detector 9 according to the embodiment. The liquid surface detector 9 is attached to the image forming apparatus 100. The liquid surface detector 9 can be said to be one of components (units) to be incorporated in the image forming apparatus 100. The liquid surface detector 9 (a combination of the detecting circuit board 95 and the electrode pad 93) is manufactured in another site. The manufactured liquid surface detector 9 is carried in the factory where the image forming apparatus 100 is assembled and manufactured, and is attached to (incorporated in) the image forming apparatus 100.

In the process of manufacturing the liquid surface detector 9, the initial values are written to the memory 94. The initial values are data for determining the first capacitance, i.e. the capacitance of the first resonance circuit 91. The initial values include the initial empty value 97 and the initial upper end value 98 described above. In addition, the initial values may include a temperature compensating capacitance 99. The temperature compensating capacitance 99 is a capacitance of the capacitor C2 of the second resonance circuit 92 when storing the initial values.

Before writing the initial values, the inductance values of the coil L1 and the coil L2 of the liquid surface detector 9 are written beforehand to the memory 94 in a nonvolatile manner. It is because that they are necessary for determining the first capacitance. The inductance values of the coil L1 and the coil L2 are determined in the designing stage. Therefore, the memory 94 may store design values. Alternatively, the inductance values of the coil L1 and the coil L2 may be measured with an instrument. The measured results may be stored in the memory 94.

When storing the initial values in the manufacturing process, the liquid surface detector 9 is set on a jig for writing the initial values. The state where it is attached to the image forming apparatus 100 is simulated. In addition, the jig can include a computer for setting, for example. When the liquid surface detector 9 is set on the jig, the computer for setting and the detection control circuit 90 are connected to each other via a communication line. In this way, it is possible to issue a command from the computer for setting to the detection control circuit 90.

The flow of FIG. 5 starts in the state where the liquid surface detector 9 is set on the jig. First, the detection control circuit 90 determines the initial empty value 97 (Step #11). For instance, the computer for setting issues a command to determine the initial empty value 97. In accordance with this command as a trigger, the detection control circuit 90 performs Step #11.

Specifically, when determining the initial empty value 97, an operator may attach (make contact of) the electrode pad 93 to the empty waste ink tank 75. Note that it is sufficient when the first capacitance in the empty state can be sensed, and therefore it may be possible to measure in the state where the electrode pad 93 is not attached to the waste ink tank 75. After that, the detection control circuit 90 applies the AC voltage while changing the frequency, and senses the resonance frequency of the first resonance circuit 91. On the basis of the sensed resonance frequency and the inductance value of the coil L1, the detection control circuit 90 determines the first capacitance in the empty state as the initial empty value 97.

Next, detection control circuit 90 determines the initial upper end value 98 (Step #12). For instance, the computer for setting issues a command to determine the initial upper end value 98. In accordance with this command as a trigger, the detection control circuit 90 performs Step #12.

Specifically, when determining the initial upper end value 98, the operator attaches the electrode pad 93 to the waste ink tank 75 filled with waste ink. The operator attaches (makes contact of) the electrode pad 93 to the waste ink tank 75 so that the liquid surface coincides with the upper end of the electrode pad 93. After that, the detection control circuit 90 applies the AC voltage and senses the resonance frequency of the first resonance circuit 91. On the basis of the sensed resonance frequency and the inductance value of the coil L1, the detection control circuit 90 determines the first capacitance in the state where the waste ink tank 75 is filled with the waste ink, as the initial upper end value 98.

Next, the detection control circuit 90 determines the temperature compensating capacitance 99 (Step #13). For instance, the computer for setting issues a command to determine the temperature compensating capacitance 99. In accordance with this command as a trigger, the detection control circuit 90 performs Step #13. Specifically, when determining the temperature compensating capacitance 99, the detection control circuit 90 applies the AC voltage to the second resonance circuit 92 and senses the resonance frequency of the second resonance circuit 92. On the basis of the sensed resonance frequency and the inductance value of the coil L2, the detection control circuit 90 determines the second capacitance, i.e. a capacitance of the second resonance circuit 92, as the temperature compensating capacitance 99.

The detection control circuit 90 writes the initial values to the memory 94 (Step #14). In this way, the memory 94 stores the initial values and the inductance values of the coils L1 and L2 in a nonvolatile manner, as the data for detecting the liquid surface. The initial values are the initial empty value 97, the initial upper end value 98, and the temperature compensating capacitance 99, which were determined above. The detection control circuit 90 finishes the writing process of the initial values (END).

(Registration of Error Value 910)

Figure 6:
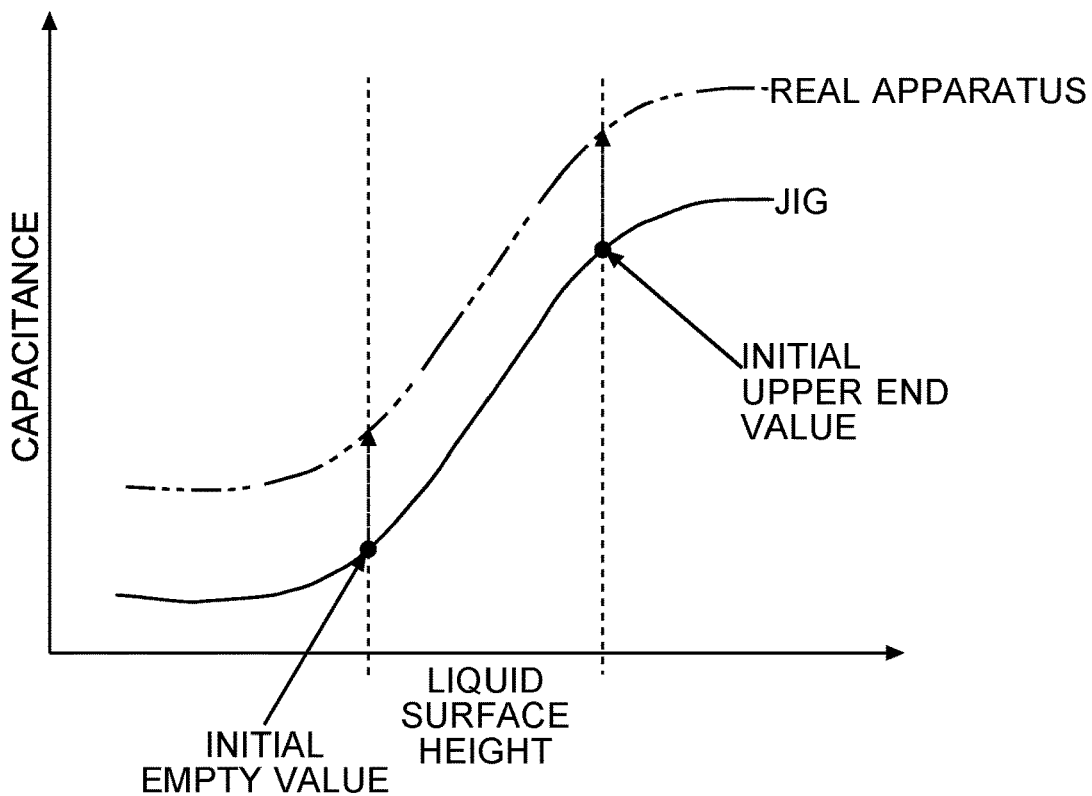
FIG. 6 is a diagram illustrating an example of a difference between capacitances determined in the liquid surface detector according to the embodiment.
Figure 7:
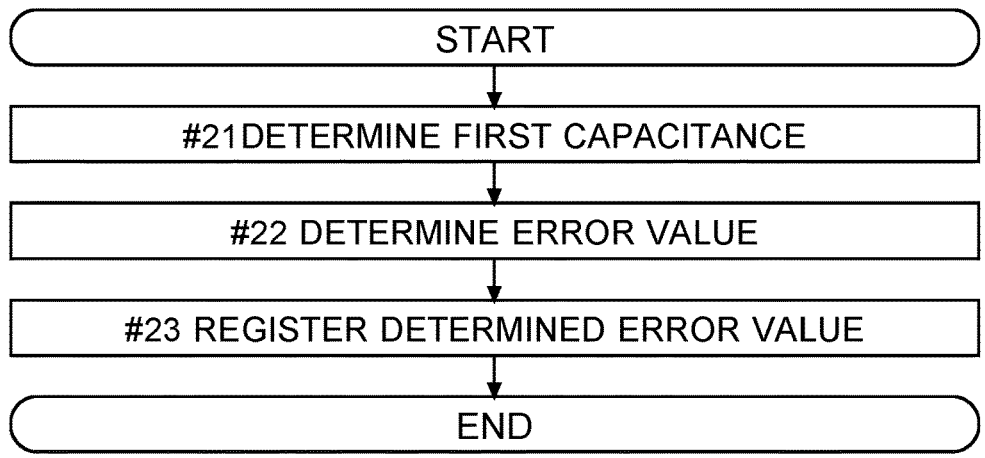
FIG. 7 is a diagram illustrating an example of a flow of registering an error value in the liquid surface detector according to the embodiment.

Next, with reference to FIGS. 6 and 7, there is described an example of registering an error value 910 in the liquid surface detector 9 according to the embodiment. The liquid surface detector 9 is attached to the image forming apparatus 100. The detecting (measuring) environment of the resonance frequency and the capacitance is different between the real one and the jig of the image forming apparatus 100. There is a difference in the detecting conditions (measuring conditions). Therefore, even when the liquid surface height of the waste ink tank 75 is the same, there occurs a difference in the first capacitance determined by the detection control circuit 90 (the capacitance of the first resonance circuit 91). A plurality of causes are considered for this difference. One of the causes is considered to be that a stray capacitance CO from the detecting circuit board 95 to the electrode pad 93 (see FIG. 4) is different between the jig and the real image forming apparatus 100.

FIG. 6 is a graph illustrating an example of a difference of the first capacitance due to the difference of the detection environment. FIG. 6 shows an example of a case where the determined (measured) first capacitance is larger when actually attached to the image forming apparatus 100. Note that there may be a case where the determined first capacitance is smaller when actually attached to the image forming apparatus 100.

The liquid surface detector 9 determines the liquid surface level value using the initial values. When the difference of the first capacitance is large before and after attachment to the image forming apparatus 100 due to the difference of the detection environment, the liquid surface height cannot be detected accurately. Therefore, the image forming apparatus 100 corrects the determined first capacitance when determining the liquid surface level value. For this correction, the error value 910 is stored in the memory 94. The registration (storage) of the error value 910 is performed after attachment of the liquid surface detector 9 to the image forming apparatus 100. The registration of the error value 910 may be performed as one step of the manufacturing and assembling process of the image forming apparatus 100, or it may be performed as one of pre-shipment inspection items of the image forming apparatus 100.

The flow of FIG. 7 starts when the registration of the error value 910 is started. At the time point of FIG. 7, the liquid surface detector 9 is already attached to the image forming apparatus 100. The flow of FIG. 7 starts, for example, when the operation panel 4 receives a command to perform the registration of the error value 910 in the state where the liquid surface detector 9 is attached to the image forming apparatus 100. The operator issues the registration command. The controller 1 and the detection control circuit 90 are connected to each other in a communicable manner (see FIG. 4). The controller 1 sends to the detection control circuit 90 a command to start the registration of the error value 910. When receiving this command, the detection control circuit 90 starts the process of storing the error value 910.

First, the detection control circuit 90 determines the first capacitance after attachment to the image forming apparatus 100 (in the state of being attached to the image forming apparatus 100) (Step #21). Specifically, the detection control circuit 90 applies the AC voltage and senses the resonance frequency of the first resonance circuit 91. On the basis of the sensed resonance frequency and the inductance value of the coil L1, the detection control circuit 90 determines the first capacitance.

Note that when registering the error value 910, the waste ink tank 75 may either be attached to the image forming apparatus 100 or not attached. When attaching the waste ink tank 75, the waste ink tank 75 with no liquid (empty) is used. However, it is preferred to set the same state as that when the initial empty value 97 was determined. For instance, when the capacitance of the waste ink tank 75 with no liquid (when empty) was measured so as to obtain the initial empty value 97, it is preferred to attach the electrode pad 93 to the waste ink tank 75 with no liquid (when empty).

Next, on the basis of the first capacitance determined in Step #21, the detection control circuit 90 determines the error value 910 (Step #22). Then, the detection control circuit 90 store (write) the determined error value 910 to the memory 94 (Step #23 to END). In this way, the memory 94 newly stores the error value 910 in a nonvolatile manner.

FIG. 6 is a graph illustrating curves indicating changes of the first capacitance in accordance with the liquid surface height of the waste ink. Although the detection environment changes, the constitution of the detection control circuit 90, the coil L1, and the ink is not changed. Therefore, the inclination of the curve and the shape of the curve are not largely different between the case of being attached to the jig and the case of being attached to the image forming apparatus 100.

It is possible to use the waste ink tank 75 filled with the waste ink for registration of the error value 910. However, it takes much time and effort to prepare the waste ink tank 75 filled with the waste ink up to the upper end of the electrode pad 93. In addition, replacement of the waste ink tank 75 is required after the registration of the error value 910. Therefore, the image forming apparatus 100 calculates the error value 910 by subtracting the initial empty value 97 from the first capacitance with no liquid measured after attachment to the image forming apparatus 100 (the first capacitance determined in Step #21).

(Calculation of Liquid Surface Level Value)

Figure 8:
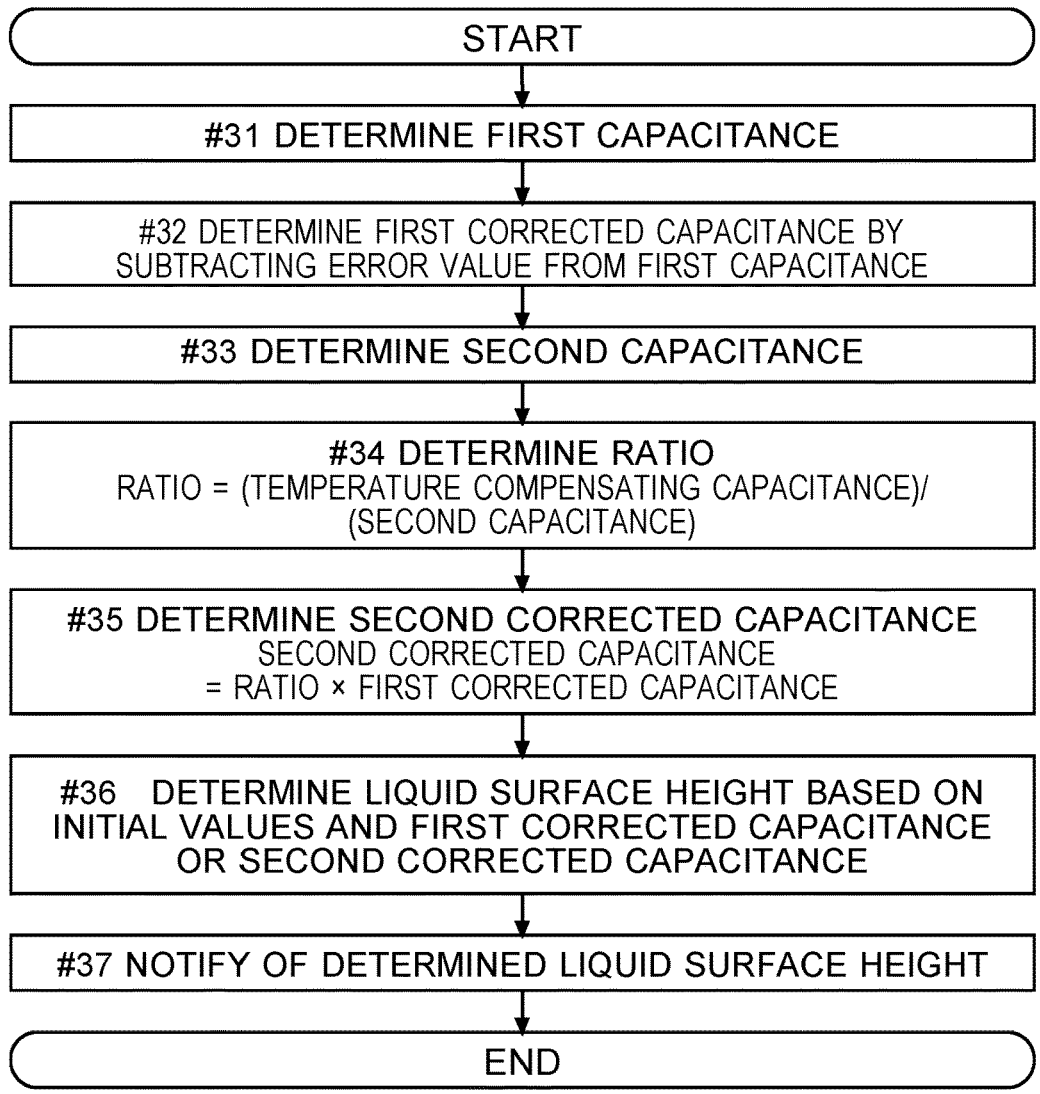
FIG. 8 is a diagram illustrating an example of a flow of calculating a liquid surface level value by the liquid surface detector according to the embodiment.

Next, with reference to FIG. 8, there is described an example of a flow of calculating the liquid surface level value by the liquid surface detector 9 according to the embodiment. The flow of FIG. 8 starts when starting the calculation of the liquid surface level value of the waste ink tank 75. Also at the time point when the flow of FIG. 8 starts, the liquid surface detector 9 is attached to the image forming apparatus 100. The controller 1 sends a command to start the calculation of the liquid surface level value to the detection control circuit 90. When receiving this command, the detection control circuit 90 starts the calculation process of the liquid surface level value.

When a main power is turned on so that the image forming apparatus 100 is activated, the controller 1 may send the command to start the calculation to the detection control circuit 90. When having performed the purge process, the controller 1 may send the command to start the calculation to the detection control circuit 90. When starting printing, the controller 1 may send the command to start the calculation to the detection control circuit 90. When the printing is finished, the controller 1 may send the command to start the calculation to the detection control circuit 90. When a cover to be opened for replacing the waste ink tank 75 is opened and closed, the controller 1 may send the command to start the calculation to the detection control circuit 90.

First, the detection control circuit 90 determines the first capacitance (Step #31). Specifically, the detection control circuit 90 applies the AC voltage and senses the resonance frequency of the first resonance circuit 91. On the basis of the sensed resonance frequency and the inductance value of the coil L1, the detection control circuit 90 determines the first capacitance (the capacitance of the first resonance circuit 91, the capacitance of the waste ink tank 75).

Next, the detection control circuit 90 determines a first corrected capacitance by subtracting the error value 910 from the determined first capacitance (Step #32). The first corrected capacitance is a value obtained by correcting the first capacitance determined in Step #31 using the error value 910, in order to reduce an influence of a change in the detection environment.

When the first capacitance obtained when the error value 910 is registered (after attachment to the image forming apparatus 100) is larger than the initial empty value 97 (see FIG. 6), the error value 910 is a positive value. Therefore, the correction in Step #32 decreases the first capacitance. On the contrary, when the first capacitance obtained when the error value 910 is registered is smaller than the initial empty value 97, the error value 910 is a negative value. In this case, the correction in Step #32 increases the first capacitance.

Next, the detection control circuit 90 determines the second capacitance (Step #33). Specifically, the detection control circuit 90 applies the AC voltage and senses the resonance frequency of the second resonance circuit 92. On the basis of the sensed resonance frequency and the inductance value of the coil L2, the detection control circuit 90 determines the second capacitance (capacitance of the second resonance circuit 92).

A capacitance of a capacitor changes in accordance with temperature. Here, the second resonance circuit 92 is not connected to anything other than the detection control circuit 90. When there is a difference between the determined second capacitance and the temperature compensating capacitance 99, its cause is considered to be a temperature difference between the time point when the initial values are registered and the current time point. The first resonance circuit 91 is also affected by the temperature difference. Therefore, on the basis of the temperature compensating capacitance 99 and the determined second capacitance, the detection control circuit 90 performs a predetermined calculation so as to determine a second corrected capacitance obtained by correcting the first corrected capacitance.

Specifically, the detection control circuit 90 divides the temperature compensating capacitance 99 by the second capacitance determined in Step #33 so as to determine a ratio (Step #34) (ratio=(temperature compensating capacitance 99)/(second capacitance)). Further, the detection control circuit 90 multiplies the first corrected capacitance by the obtained ratio, so as to determine the second corrected capacitance (Step #35). Because the correction is performed on the basis of the ratio, the capacitance of the capacitor C2 of the second resonance circuit 92 can be smaller than that of the first resonance circuit 91. It is possible to use a small inexpensive capacitor.

Each of the capacitances of the first resonance circuit 91 and the second resonance circuit 92 becomes larger as the temperature becomes higher. When the current second capacitance is larger than the temperature compensating capacitance 99 (the capacitance using the jig), the current temperature is higher than the temperature when the temperature compensating capacitance 99 was determined. According to the calculation described above, the determined ratio is less than one. Therefore, the correction in Step #34 is performed in the direction of decreasing the capacitance.

On the contrary, when the current second capacitance is smaller than the temperature compensating capacitance 99, the current temperature is lower than the temperature when the initial values were determined. According to the calculation described above, the determined ratio is more than one. The correction in Step #34 is performed in the direction of increasing the capacitance.

Further, the detection control circuit 90 determines the liquid surface level value on the basis of the initial values (the initial empty value 97, the initial upper end value 98) and the first corrected capacitance or the second corrected capacitance (Step #36). On the basis of the first corrected capacitance, the detection control circuit 90 may determine the liquid surface level value. Alternatively, on the basis of the second corrected capacitance, the detection control circuit 90 may determine the liquid surface level value.

When the first corrected capacitance is used, the liquid surface level value is determined without performing the correction for the temperature. When the second corrected capacitance is used, the liquid surface level value is determined with the correction for the temperature. The operation panel 4 may receive a selection whether to use the first corrected capacitance or the second corrected capacitance. The detection control circuit 90 determines the liquid surface level value using the selected corrected capacitance. When the second corrected capacitance is not used, the detection control circuit 90 may skip Steps #33 to #35.

A detection method when using the first corrected capacitance is described. A represents the first corrected capacitance, B represents the initial empty value 97, and C represents the initial upper end value 98. Then, the detection control circuit 90 performs calculation of (A−B)/(C−B). The detection control circuit 90 determines the ratio as the liquid surface level value (the liquid surface height of the liquid).

Next, a detection method when using the second corrected capacitance is described. D represents the second corrected capacitance, E represents the initial empty value 97, and F represents the initial upper end value 98. Then, the detection control circuit 90 performs calculation of (D−E)/(F−E). The detection control circuit 90 determines the ratio as the liquid surface level value. Note that B and E may be the same value. Further, C and F may be the same value.

Further, the detection control circuit 90 notifies the controller 1 of the liquid surface level value (Step #37 to END). As the liquid surface position in the waste ink tank 75 is higher, the determined ratio (liquid surface level value) is closer to one. As the liquid surface position in the waste ink tank 75 is lower, the determined ratio is closer to zero. In other words, the controller 1 can sense how much waste ink is collected on the basis of the liquid surface level value.

(Notification Based on Detection Result)

Figure 9:
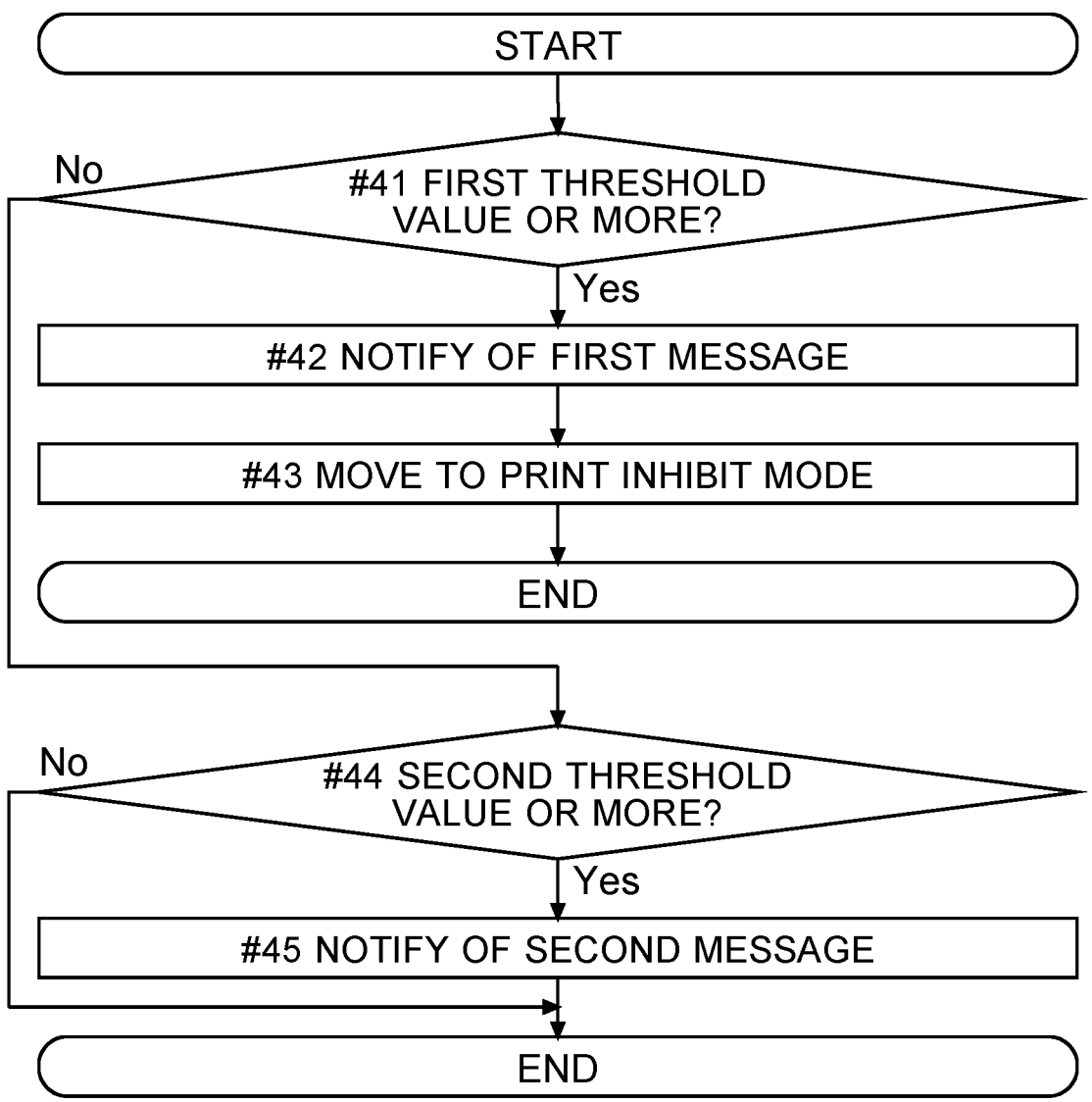
FIG. 9 illustrates an example of notification in the image forming apparatus according to the embodiment.

Next, with reference to FIG. 9, there is described an example of notification in the image forming apparatus 100 according to the embodiment. The controller 1 receives the value indicating the liquid surface height (liquid surface level value) from the liquid surface detector 9 (detection control circuit 90). On the basis of the liquid surface level value, the controller 1 can sense whether or not the time for replacement of the waste ink tank 75 has come. In addition, it can also sense whether or not the ink is collected to an extent of a risk causing the ink to overflow from the waste ink tank 75. The controller 1 notifies the user on the basis of the liquid surface level value informed by the liquid surface detector 9. Hereinafter, with reference to FIG. 9, an example of a flow of the notification is described. The flow of FIG. 9 starts at a time point when receiving the liquid surface level value from the liquid surface detector 9 (detection control circuit 90).

The controller 1 checks whether or not the liquid surface level value is a first threshold value or more (Step #41). The first threshold value is a value for determining whether or not the waste ink is collected to an extent necessary to stop printing. When printing is performed in the state where the ink is collected too much, the waste ink may overflow. In addition, when the waste ink tank 75 is detached for replacement, there is a high risk of spilling the waste ink. The first threshold value is determined in advance. For instance, the storage medium 2 (storage) stores the first threshold value in a nonvolatile manner. For instance, the first threshold value is a value in the range of 80 to 100%.

When the liquid surface level value is the first threshold value or more (Yes in Step #41), the controller 1 controls the notification unit to perform notification of a first message (Step #42). The first message is a message informing that the waste ink tank 75 should be replaced and that printing is inhibited until the waste ink tank 75 is replaced. The notification unit is either the display panel 41 or the communication circuit 12, or is both of them. The controller 1 may control the display panel 41 to display the first message. Further, the controller 1 may control the communication circuit 12 to send data including the first message to the computer 200 of an administrator of the image forming apparatus 100.

In this case, the controller 1 sets the image forming apparatus 100 to a print inhibit mode in which the print job cannot be started (Step #43 to END). Specifically, even when the command to start the print job is issued, the sheet feeder 5, the sheet conveyer 6, and the image former 7 are not allowed to operate.

In order to cancel the print inhibit mode, the user is required to replace the waste ink tank 75. For instance, a sensor is disposed for detecting open and close of a cover that is opened when the waste ink tank 75 is removed. When this cover is opened and closed, the controller 1 controls the liquid surface detector 9 to determine the liquid surface level value. When the newly informed liquid surface level value is less than the first threshold value, the controller 1 cancels the print inhibit mode.

When the liquid surface level value is less than the first threshold value (No in Step #41), the controller 1 checks whether or not the liquid surface level value is a second threshold value or more (Step #44). The second threshold value is a value for determining whether or not to display a message to urge replacement of the container (waste ink tank 75). The second threshold value is determined in advance. For instance, the storage medium 2 (storage) stores the second threshold value in a nonvolatile manner. For instance, the second threshold value can be a value in the range of 40 to 70%. However, the second threshold value is smaller than the first threshold value.

When the liquid surface level value is the second threshold value or more (Yes in Step #44), the controller 1 controls the notification unit to perform notification of a second message (Step #45). After Step #45, or when the liquid surface level value is less than the second threshold value (No in Step #44), the controller 1 finishes the process of this flowchart (END). The second message is a message informing that the waste ink tank 75 should be replaced or that the time for replacement is close. The controller 1 may control the display panel 41 to display the second message. Further, the controller 1 may control the communication circuit 12 to send data including the second message to the computer 200 of the administrator of the image forming apparatus 100.

In this way, the liquid surface detector 9 according to the embodiment is attached to the image forming apparatus 100. The liquid surface detector 9 includes the electrode pad 93, the coil L1, the memory 94, and the detection control circuit 90. The electrode pad 93 is attached to the outer side surface of the tank for containing liquid disposed in the image forming apparatus 100. The coil L1 is connected the electrode pad 93 and is a part of the first resonance circuit 91. The memory 94 stores the initial values in a nonvolatile manner. The detection control circuit 90 senses the resonance frequency of the first resonance circuit 91 in which the tank with the attached electrode pad 93 is used as a capacitor. On the basis of the sensed resonance frequency, the detection control circuit 90 determines the first capacitance as a capacitance of the first resonance circuit 91. When storing the initial values in the memory 94, the detection control circuit 90 determines the first capacitance before attachment to the image forming apparatus 100. The memory 94 stores the determined first capacitance as the initial values. When storing the error value 910 in the memory 94, the detection control circuit 90 determines the first capacitance after attachment to the image forming apparatus 100, and determines the error value 910 on the basis of a difference between the initial value and the first capacitance determined after attachment to the image forming apparatus 100. The memory 94 stores the determined error value 910. When determining the liquid surface level value as a value indicating a liquid surface height of the liquid in the height direction of the electrode pad 93, the detection control circuit 90 may determine the first capacitance, may determine the first corrected capacitance by subtracting the error value 910 from the determined first capacitance, and may determine the liquid surface level value on the basis of the first corrected capacitance and the initial values. The tank is the waste ink tank 75, for example.

When determining the liquid surface level value, the first capacitance can be corrected on the basis of the error value 910. In other words, the capacitance obtained by measurement after attachment to the image forming apparatus 100 can be corrected so that the first capacitance has a value obtained in the measuring environment when the initial values are determined. On the basis of the corrected first capacitance (first corrected capacitance) and the initial values, the value indicating the liquid surface height (liquid surface level value) can be accurately determined. In addition, the electrode pad 93 is attached to the outside of the replaceable tank. Because the electrode pad 93 is another body different from the tank, manufacturing cost of the tank can be reduced. In addition, because the electrode pad 93 does not contact with the liquid, the electrode pad 93 does not become dirty.

The memory 94 stores the initial empty value 97 and the initial upper end value 98 as the initial values. The initial empty value 97 is a value obtained by measurement before attachment to the image forming apparatus 100 and is the first capacitance with no liquid. The initial upper end value 98 is a value obtained by measurement before attachment to the image forming apparatus 100 and is the first capacitance when the liquid surface height is the same as the upper end height of the electrode pad 93. When A represents the first corrected capacitance, B represents the initial empty value 97, and C represents the initial upper end value 98, the detection control circuit 90 performs calculation of (A−B)/(C−B), so as to determine the liquid surface level value. It is possible to detect the ratio of the height that the liquid surface has currently reached, in the range from the level of no liquid to the height corresponding to the initial upper end value 98.

The memory 94 stores the initial empty value 97. The memory 94 stores the value obtained by subtracting the initial empty value 97 from the first capacitance with no liquid obtained after attachment to the image forming apparatus 100, as the error value 910. The error value 910 can be determined as the difference between the first capacitance in the state of no liquid when the initial values are stored and the first capacitance in the state of no liquid after attachment to the image forming apparatus 100. The first capacitance can be appropriately corrected.

The liquid surface detector 9 includes the second resonance circuit 92, which is connected to the detection control circuit 90 but is not connected to the electrode pad 93 and includes the capacitor C2. The detection control circuit 90 senses the resonance frequency of the second resonance circuit 92, and determines the second capacitance as a capacitance of the second resonance circuit 92 on the basis of the resonance frequency of the sensed second resonance circuit 92. The memory 94 stores the temperature compensating capacitance 99 in a nonvolatile manner. When storing the temperature compensating capacitance 99 in the memory 94, the detection control circuit 90 determines the second capacitance before attachment to the image forming apparatus 100. The memory 94 stores the determined second capacitance as the temperature compensating capacitance 99. When determining the liquid surface level value, the detection control circuit 90 may determine the second capacitance after attachment to the image forming apparatus 100, may perform a predetermined calculation on the basis of the temperature compensating capacitance 99 and the second capacitance determined after attachment to the image forming apparatus 100, so as to determine the second corrected capacitance obtained by correcting the first corrected capacitance, and may determine the liquid surface level value on the basis of the second corrected capacitance and the initial values. A capacitance of a capacitor changes in accordance with temperature. The determined capacitance (the first capacitance, the first corrected capacitance) can be corrected, so as to eliminate an influence of the temperature difference between when the initial values are stored and when the liquid surface level value is determined. Because an influence of the temperature difference is reduced, the current liquid surface height can be accurately detected.

The liquid surface detector 9 includes the single detecting circuit board 95. The detecting circuit board 95 includes the memory 94, the detection control circuit 90, the coil L1, and the second resonance circuit 92, and is connected to the electrode pad 93 via the signal line 96. The liquid surface detector 9 can be integrated into the single circuit board. The memory 94, the detection control circuit 90, the coil L1, and the second resonance circuit 92 can be integrally attached to the image forming apparatus 100, only by attaching the circuit board.

The memory 94 stores the initial empty value 97 and the initial upper end value 98 as the initial values. When D represents the second corrected capacitance, E represents the initial empty value 97, and F represents the initial upper end value 98, then the detection control circuit 90 may perform calculation of (D−E)/(F−E) so as to determine the liquid surface level value. It is possible to detect the ratio of the height that the liquid surface has currently reached, in the range from the height corresponding to the initial empty value 97 to the height corresponding to the initial upper end value 98.

The detection control circuit 90 multiplies the first corrected capacitance by the ratio as the predetermined calculation. The ratio is a value obtained by dividing the temperature compensating capacitance 99 by the second capacitance determined when the liquid surface level value is determined. A change rate of the capacitance due to the temperature difference can be determined. By multiplying the first corrected capacitance by the determined change rate, it is possible to determine the first capacitance from which an influence of the temperature difference is eliminated (the second corrected capacitance).

The liquid is ink. The tank is a container for containing the ink (waste ink). The image forming apparatus 100 includes the image former 7 for printing based on the ink, and the liquid surface detector 9. The liquid surface height of the ink contained in the tank can be accurately detected.

The image forming apparatus 100 includes the notification unit to perform notification and the controller 1. When the detected liquid surface height is a predetermined threshold value or more, the controller 1 controls the notification unit to perform notification of necessity of replacing the tank. It is possible to notify (warn) the user that there is a lot of ink in the tank. Specifically, the notification unit performs notification on the basis of the liquid surface level value. The notification unit is either the display panel 41 or the communication circuit 12, or is both of them. When the liquid surface level value is the predetermined first threshold value or more, the notification unit performs notification of the first message indicating that the tank (waste ink tank 75) should be replaced. In addition, when the liquid surface level value is less than the first threshold value but is more than or equal to the predetermined second threshold value, the notification unit performs notification of the second message indicating that the tank should be replaced or that the time for replacement is close.

Although the embodiment of the present disclosure is described above, the scope of the present disclosure is not limited to this. The present disclosure can be variously modified for implementation within the scope not deviating from the spirit of the disclosure.

For instance, the above description is the example in which the liquid surface detector is applied to the waste ink tank. However, it may be possible to apply the liquid surface detector 9 to the ink tank 81 for supplying ink to each line head. In this case, the liquid surface level value is a value indicating a remaining ink amount in the ink tank 81.

What is claimed is:

1. A liquid surface detector attached to an image forming apparatus, the detector comprising:
an electrode pad attached to an outer side surface of a tank for containing liquid disposed in the image forming apparatus, the tank being removable from the image forming apparatus;
a coil connected to the electrode pad, the coil being a part of a first resonance circuit;
a second resonance circuit that is not connected to the electrode pad and that includes a capacitor;
a memory for storing an initial value in a nonvolatile manner; and a detection control circuit
that senses a resonance frequency of the first resonance circuit and determines capacitance of the first resonance circuit on the basis of the sensed resonance frequency and
that senses a resonance frequency of the second resonance circuit and determines a capacitance of the second resonance circuit on the basis of the sensed resonance frequency of the second resonance circuit, wherein the memory stores an initial empty value, an initial upper end value, and a temperature compensating capacitance as the initial value, the initial empty value is a value obtained by measurement before attachment to the image forming apparatus, and is the capacitance of the first resonance circuit with no liquid, the initial upper end value is a value obtained by measurement before attachment to the image forming apparatus, and is the capacitance of the first resonance circuit when the liquid surface height is the same as an upper end height of the electrode pad, when storing the initial value in the memory, the detection control circuit determines, before attachment to the image forming apparatus, the capacitance of the first resonance circuit as the initial empty value in a state where the electrode pad is removed from the image forming apparatus and is attached to the tank that is empty or in a state where the electrode pad is not attached to the tank, the detection control circuit determines, before attachment to the image forming apparatus, the capacitance of the first resonance circuit as the initial upper end value in a state where the electrode pad is attached to the tank removed from the image forming apparatus and empty and the liquid surface of the liquid coincides with the upper end of the electrode pad, the detection control circuit determines, before attachment to the image forming apparatus, the capacitance of the second resonance circuit as the temperature compensating capacitance, the memory stores the determined initial empty value, the determined initial upper end value, and the determined temperature compensating capacitance as the initial value, when storing an error value in the memory, the detection control circuit determines, after attachment to the image forming apparatus, the capacitance of the first resonance circuit in a state where the electrode pad is attached to the tank removed from the image forming apparatus and filled with the liquid or in a state where the tank is not attached to the image forming apparatus and accordingly the electrode pad is not attached to the tank, the memory stores the error value based on a difference between the initial empty value and the capacitance of the first resonance circuit determined after attachment to the image forming apparatus, and when determining a liquid surface level value as a value indicating a liquid surface height of the liquid in a height direction of the electrode pad, the detection control circuit
determines the capacitance of the first resonance circuit in a state where the electrode pad is attached to the tank attached to the image forming apparatus and empty,
determines a first corrected capacitance by subtracting the error value from the determined capacitance of the first resonance circuit,
determines the capacitance of the second resonance circuit,
determines a second corrected capacitance by correcting the first corrected capacitance by performing a predetermined calculation based on the temperature compensating capacitance and the capacitance of the second resonance circuit determined after attachment to the image forming apparatus, and
determines the liquid surface level value by performing a calculation of $(D-E)/(F-E)$, where D represents the second corrected capacitance, E represents the initial empty value, and F represents the initial upper end value.

2. The liquid surface detector according to claim 1, further comprising one detecting circuit board, wherein
the detecting circuit board includes the memory, the detection control circuit, and the coil, and is connected to the electrode pad via a signal line.

3. The liquid surface detector according to claim 1, wherein
the detection control circuit determines the error value by subtracting the initial empty value from the capacitance of the first resonance circuit with no liquid obtained after attachment to the image forming apparatus.

4. The liquid surface detector according to claim 1, further comprising a detecting circuit board, wherein
the detecting circuit board includes the memory, the detection control circuit, the coil, and the second resonance circuit, and is connected to the electrode pad via a signal line.

5. A liquid surface detector attached to an image forming apparatus, the detector comprising:
an electrode pad attached to an outer side surface of a tank for containing liquid disposed in the image forming apparatus;
a coil connected to the electrode pad, the coil being a part of a first resonance circuit;
a memory for storing an initial value in a nonvolatile manner; and
a second resonance circuit that is not connected to the electrode pad and that includes a capacitor;
a detection control circuit
that senses a resonance frequency of the first resonance circuit in which the tank with the attached electrode pad is used as a capacitor and determines a capacitance of the first resonance circuit on the basis of the sensed resonance frequency and
that senses a resonance frequency of the second resonance circuit and determines as a capacitance of the second resonance circuit on the basis of the sensed resonance frequency of the second resonance circuit, wherein the memory stores an initial empty value, an initial upper end value, and a temperature compensating capacitance as the initial value, the initial empty value is a value obtained by measurement before attachment to the image forming apparatus, and is the capacitance of the first resonance circuit with no liquid, the initial upper end value is a value obtained by measurement before attachment to the image forming apparatus, and is the capacitance of the first resonance circuit when the liquid surface height is the same as the upper end height of the electrode pad, when storing the initial value in the memory, the detection control circuit determines, before attachment to the image forming apparatus, the capacitance of the first resonance circuit as the initial empty value in a state where the electrode pad is removed from the image forming apparatus and is attached to the tank that is empty or in a state where the electrode pad is not attached to the tank, the detection control circuit determines, before attachment to the image forming apparatus, the capacitance of the first resonance circuit as the initial upper end value in a state where the electrode pad is attached to the tank removed from the image forming apparatus and empty and the liquid surface of the liquid coincides with the upper end of the electrode pad, the detection control circuit determines, before attachment to the image forming apparatus, the capacitance of the second resonance circuit as the temperature compensating capacitance, the memory stores the determined initial empty value, the determined initial upper end value, and the determined temperature compensating capacitance as the initial value, when storing an error value in the memory, the detection control circuit determines, after attachment to the image forming apparatus, the capacitance of the first resonance circuit in a state where the electrode pad is attached to the tank removed from the image forming apparatus and filled with the liquid or in a state where the tank is not attached to the image forming apparatus and accordingly the electrode pad is not attached to the tank, the memory stores the error value based on a difference between the initial empty value and the capacitance of the first resonance circuit determined after attachment to the image forming apparatus, and when determining a liquid surface level value as a value indicating a liquid surface height of the liquid in a height direction of the electrode pad, the detection control circuit
- determines the capacitance of the first resonance circuit in a state where the electrode pad is attached to the tank attached to the image forming apparatus and empty,
- determines a first corrected capacitance by subtracting the error value from the determined capacitance of the first resonance circuit,
- determines the capacitance of the second resonance circuit,
- determines a second corrected capacitance by correcting the first corrected capacitance by performing a predetermined calculation based on the temperature compensating capacitance and the capacitance of the second resonance circuit determined after attachment to the image forming apparatus,
- multiples the first corrected capacitance by a ratio as the predetermined calculation, and
- determines the liquid surface level value based on the second corrected capacitance and the initial value, and the ratio is a value obtained by dividing the temperature compensating capacitance by the capacitance of the second resonance circuit determined when the liquid surface level value is determined.

6. An image forming apparatus comprising:
the liquid surface detector according to claim 1; and
an image former for printing based on the liquid, wherein the liquid is ink, and the tank is a container for containing the ink.

7. The image forming apparatus according to claim 6, further comprising a notification unit for performing notification based on the liquid surface level value, wherein
the notification unit is either a display panel or a communication circuit, or is both of them, and
when the liquid surface level value is a predetermined first threshold value or more, the notification unit performs notification of a first message indicating that the tank should be replaced.

8. The image forming apparatus according to claim 7, wherein
when the liquid surface level value is less than the first threshold value but is more than or equal to a predetermined second threshold value, the notification unit performs notification of a second message indicating that the tank should be replaced or that the time for replacement is close.

9. A method for controlling a liquid surface detector, comprising:
attaching an electrode pad of a liquid surface detector to an outer side surface of a tank for containing liquid disposed in an image forming apparatus, the tank being removable from the image forming apparatus;
connecting a coil as a part of a first resonance circuit to the electrode pad;
storing an initial value;
sensing a resonance frequency of the first resonance circuit;
determining a capacitance of the first resonance circuit on the basis of the sensed resonance frequency of the first resonance circuit;
sensing a resonance frequency of the second resonance circuit that is not connected to the electrode pad and that includes a capacitor;
determining a capacitance of the second resonance circuit on the basis of the sensed resonance frequency of the second resonance circuit,
storing as the initial value
- an initial empty value, which is a value obtained by measurement before attachment to the image forming apparatus and which is the capacitance of the first resonance circuit with no liquid,
- an initial upper end value, which is a value obtained by measurement before attachment to the image forming apparatus and which is the capacitance of the first resonance circuit when the liquid surface height is the same as the upper end height of the electrode pad, and
- a temperature compensating capacitance;

when storing the initial value, before attachment of the liquid surface detector to the image forming apparatus,
- determining the capacitance of the first resonance circuit as the initial empty value in a state where the electrode pad is attached to the tank removed from the image forming apparatus and empty or in a state where the electrode pad is not attached to the tank,
- determining the capacitance of the first resonance circuit as the initial upper end value in a state where the electrode pad is attached to the tank removed from the image forming apparatus and filled with the liquid and the liquid surface of the liquid coincides with the upper end of the electrode pad, determining the capacitance of the second resonance circuit as the temperature compensating capacitance, and storing the determined initial empty value, the determined initial upper end value, and the determined temperature compensating capacitance as the initial value;

when storing an error value in the memory, after attachment of the liquid surface detector to the image forming apparatus, determining the capacitance of the first resonance circuit in a state where the electrode pad is attached to the tank attached to the image forming apparatus and empty or in a state where the tank is not attached to the image forming apparatus and accordingly the electrode pad is not attached to the tank, and storing the error value based on a difference between the capacitance of the first resonance circuit determined after attachment to the image forming apparatus and the initial value; and when determining a liquid surface level value as a value indicating a liquid surface height of the liquid in a height direction of the electrode pad, determining the capacitance of the first resonance circuit in a state where the electrode pad is attached to the image forming apparatus and is attached to the tank containing the liquid, determining a first corrected capacitance by subtracting the error value from the determined capacitance of the first resonance circuit, determining the capacitance of the second resonance circuit, determining a second corrected capacitance by correcting the first corrected capacitance by performing a predetermined calculation based on the temperature compensating capacitance and the capacitance of the second resonance circuit determined after attachment to the image forming apparatus, and determining the liquid surface level value by performing a calculation of $(D-E)/(F-E)$, where D represents the second corrected capacitance, E represents the initial empty value, and F represents the initial upper end value.

10. A method for controlling a liquid surface detector, comprising:

attaching an electrode pad of a liquid surface detector to an outer side surface of a tank for containing liquid disposed in an image forming apparatus, the tank being removable from the image forming apparatus;

connecting a coil as a part of a first resonance circuit to the electrode pad;

storing an initial value;

sensing a resonance frequency of the first resonance circuit;

determining a capacitance of the first resonance circuit on the basis of the sensed resonance frequency of the first resonance circuit;

sensing a resonance frequency of the second resonance circuit that is not connected to the electrode pad and that includes a capacitor;

determining a capacitance of the second resonance circuit on the basis of the sensed resonance frequency of the second resonance circuit, storing as the initial value an initial empty value, which is a value obtained by measurement before attachment to the image forming apparatus and which is the capacitance of the first resonance circuit with no liquid, an initial upper end value, which is a value obtained by measurement before attachment to the image forming apparatus and which is the capacitance of the first resonance circuit when the liquid surface height is the same as an upper end height of the electrode pad, and a temperature compensating capacitance;

when storing the initial value, before attachment of the liquid surface detector to the image forming apparatus, determining the capacitance of the first resonance circuit as the initial empty value in a state where the electrode pad is attached to the tank removed from the image forming apparatus and empty or in a state where the electrode pad is not attached to the tank, determining the capacitance of the first resonance circuit as the initial upper end value in a state where the electrode pad is attached to the tank removed from the image forming apparatus and filled with the liquid and the liquid surface of the liquid coincides with the upper end of the electrode pad, determining the capacitance of the second resonance circuit as the temperature compensating capacitance, and storing the determined initial empty value, the determined initial upper end value, and the determined temperature compensating capacitance as the initial value;

when storing an error value in the memory, after attachment of the liquid surface detector to the image forming apparatus, determining the capacitance of the first resonance circuit in a state where the electrode pad is attached to the tank attached to the image forming apparatus and empty or in a state where the tank is not attached to the image forming apparatus and accordingly the electrode pad is not attached to the tank, and storing the error value based on a difference between the capacitance of the first resonance circuit determined after attachment to the image forming apparatus and the initial value; and when determining a liquid surface level value as a value indicating a liquid surface height of the liquid in a height direction of the electrode pad, determining the capacitance of the first resonance circuit in a state where the electrode pad is attached to the image forming apparatus and is attached to the tank containing the liquid, determining a first corrected capacitance by subtracting the error value from the determined capacitance of the first resonance circuit, determining the capacitance of the second resonance circuit, determining a second corrected capacitance by correcting the first corrected capacitance by performing a predetermined calculation based on the temperature compensating capacitance and the capacitance of the second resonance circuit determined after attachment to the image forming apparatus, and multiplying the first corrected capacitance by a ratio as the predetermined calculation, and determining the liquid surface level value based on the second corrected capacitance and the initial value, the ratio being a value obtained by dividing the temperature compensating capacitance by the capacitance of the second resonance circuit determined when the liquid surface level value is determined.

\* \* \* \* \*